(12) United States Patent
Uchikura

(10) Patent No.: US 7,080,740 B2
(45) Date of Patent: Jul. 25, 2006

(54) SORTING APPARATUS

(75) Inventor: Hideki Uchikura, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 234 days.

(21) Appl. No.: 10/679,356

(22) Filed: Oct. 7, 2003

(65) Prior Publication Data

US 2004/0074824 A1 Apr. 22, 2004

(30) Foreign Application Priority Data

Oct. 10, 2002 (JP) ............................. 2002-297415

(51) Int. Cl.
*B07C 5/00* (2006.01)
(52) U.S. Cl. ...................... 209/651; 209/633
(58) Field of Classification Search ................ 209/583, 209/651, 653, 933; 198/347.2, 358; 414/789.6, 414/790.2, 792.8, 792.9
See application file for complete search history.

(56) References Cited

U.S. PATENT DOCUMENTS

| | | | | |
|---|---|---|---|---|
| 3,955,678 A | * | 5/1976 | Moyer | 209/564 |
| 4,086,998 A | * | 5/1978 | van der Schoot | 198/358 |
| 4,354,589 A | * | 10/1982 | Fluck | 198/358 |
| 5,718,857 A | * | 2/1998 | Howlett | 264/122 |
| 6,311,827 B1 | * | 11/2001 | Draghetti | 198/418.1 |
| 6,365,862 B1 | * | 4/2002 | Miller et al. | 209/584 |

FOREIGN PATENT DOCUMENTS

| | | |
|---|---|---|
| JP | 08-127415 A | 5/1996 |
| JP | 2000-095335 A | 4/2000 |

* cited by examiner

*Primary Examiner*—Joseph Rodriguez
(74) *Attorney, Agent, or Firm*—Sughrue Mion, PLLC

(57) ABSTRACT

A sorting apparatus which separates a work according to a predetermined standard flowing on a production line and arrays the work in one column is characterized by being equipped with a carrying-in line carrying in the work, a work identifying machine provided on the way of the carrying-in line, a plurality of columns of temporary accumulating units installed neighboring the carrying-in line at an approximately same height as the carrying-in line, a plurality of trays provided respectively corresponding to the temporary accumulating units of plurality of columns of temporary accumulating units, a pusher pushing out a work which flows in said carrying-in line into one column of the temporary accumulating units based on a result identified by the work identifying machine, and a transfer machine gripping/transferring a predetermined number of works all together to the trays corresponding to the temporary accumulating units when the predetermined number of works is accumulated in a temporary accumulating unit.

20 Claims, 4 Drawing Sheets

SORTING APPARATUS

FIELD OF THE INVENTION

The present invention relates to a sorting apparatus, in particular, to the sorting apparatus of production line of a magnetic tape cartridge and the like.

BACKGROUND OF THE INVENTION

Generally, in a shipping center when distributing commercial products, a collecting place of agricultural products, a factory, and the like, the commercial products are separated according to a kind, quality, size, and the like, and sorted in different containers and places. Then, for the sorting, a commercial product recognizing means recognizing such as kinds of commercial products and a transporting means transporting commercial products to the different places according to such the kinds of the recognized commercial products are provided (for example, see Japan paten laid open publication 8-127415 and 2000-95335).

Meanwhile, when only separating by throwing in containers or loading in trucks like agricultural products and deliveries, it is acceptable to only perform carrying-out operation from a carrying-in line on which objectives flow when a certain kind of thing comes, but in production lines of a factory, there exist some cases that, in addition to carrying-out from the production lines, arraying the objectives in predetermined trays is wanted for a next process.

Here, it is necessary to put in a tray not only carrying out works from a production line but also lifting the works gripped by a large scale transfer machine in order to array them in the tray. However, if all the works are transferred one by one from the production line to the tray, because of much operation amount of the transfer machine, it needs to be provided for kinds of works and their quality, respectively, thereby equipment cost being expensive. Moreover, after a tray for a certain kind of works becomes full and until the works in the tray are brought to the next process, the full tray is in the way, thereby a next work relevant to the kind being unable to be carried in. That is, because the tray does not become vacant, carrying-out becomes impossible when the same kind of works flows on the production line.

SUMMARY OF THE INVENTION

Considering conventional problems, the present invention is embodied and its exemplary object is to provide a sorting apparatus which can be restrained low in its equipment cost and efficiently use a production line.

To solve the problems, the invention which is a sorting apparatus separating works flowing on a production line according to a predetermined standard and arraying them in one column is characterized by being equipped with a carrying-in line carrying in a work, a work identifying machine provided on the way of the carrying-in line, a plurality of columns of temporary accumulating units neighboring the carrying-in line and being installed at an approximately same height as the carrying-in line, a plurality of trays provided respectively corresponding to the plurality of columns of the temporary accumulating units, a pusher pushing out the work flows in the carrying-in line into one of columns of the temporary accumulating units determined on a basis of a result identified by the work identifying machine, and a transfer machine transferring a predetermined number of works gripping them all together in a tray corresponding to a temporary accumulating unit when the predetermined number of works are accumulated in the temporary accumulating unit.

According to such the sorting apparatus, a work flowing through the carrying-in line is identified by the work identifying machine provided on the way of the carrying-in line in compliance with a predetermined standard. The predetermined standard is applied to a size and quality of a work, a material lot used as raw material, and the like in response to a need of the production line. Then, the work is pushed out into one of columns of the temporary accumulating units determined on a basis of a result identified by the identifying machine. In the temporary accumulating units, whenever works are newly pushed out, already accumulated works are pushed, thereby being displaced by one work pitch. If the predetermined number of works is accumulated in a temporary accumulating unit, the transfer machine transfers the works in a tray corresponding to the accumulating unit by gripping the works accumulated there.

Thus, in the sorting apparatus, because carrying-out from the carrying-in line is performed by a pusher and a predetermined number of works can be accumulated in a temporary accumulating unit, operation by which a transfer machine transfers works in a tray results in being less. Therefore, a load of the transfer machine is less, whereby one transfer machine can be in charge of work transfers from a plurality of columns of the temporary accumulating units.

So, in the sorting apparatus, it is preferable to compose so that the transfer machine can transfer works to trays corresponding to more than one temporary accumulating unit.

Thus, a number of large scale transfer machines results in being less, thereby equipment cost can be kept lower. In addition, the transfer machine may be an exclusive machine for the work and an all-purpose robot is also available.

Moreover, in the sorting apparatus, because works are not put in a tray directly but after a predetermined number of works are accumulated in a temporary accumulating unit, it is not necessary to immediately use works filled in a tray for a certain kind of works at a next process and is possible to carry out into a temporary accumulating unit if the kind of works flows into the carrying-in line.

In addition, in the sorting apparatus, each of the trays can also be composed so as to be equipped with a carrying-out mechanism to move each of the trays from a receiving position, where a predetermined number of works from the accumulating unit is transferred, to a handing-over position into the next process.

DESCRIPTION OF THE PREFERRED EMBODIMENTS

The embodiments of the present invention will be described in detail, referring to drawings as needed.

Figure 1:
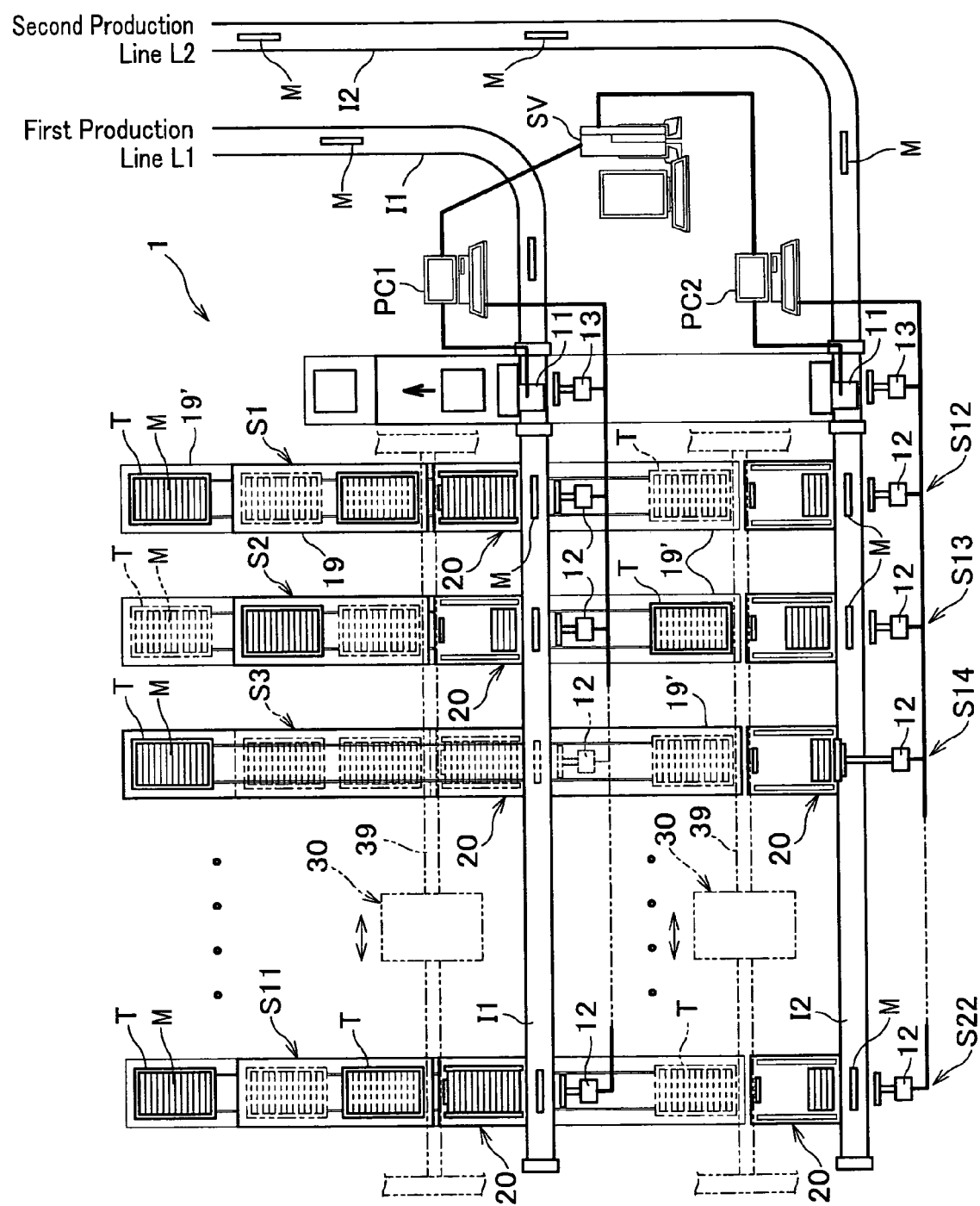
FIG. 1 is a plan view of a sorting apparatus related to the embodiment.

As shown in FIG. 1, a sorting apparatus 1 related to the invention is an apparatus to sort a magnetic tape cartridge (hereinafter simply referred to as "cartridge M") which is a work, to array it on a tray T, and to carry it out. In the embodiment, there are two production lines, a first production line L1 and second production line L2, and in each the production line, a similar sorting apparatus 1 is installed.

In the sorting apparatus 1, cartridges M entering in from the first production line L1 and second production line L2 are carried in a first carrying-in line I1 and second carrying-in line I2, respectively, barcodes indicated in the cartridges M are read by barcode readers 11 on the way, carring-out stations S1, . . . , S22 are determined based on read results of the barcodes, and the cartridges M are carried out.

The first carrying-in line I1 and second carrying-in line I2 are belt conveyors and connected with the first production line L1 and second production line L2, respectively.

A cartridge M is a magnetic tape cartridge of which outer shape is a flat box form. In the cartridge M, a sticker indicating a barcode is attached (not shown in the drawing) to its side, and the cartridge M is raised so that the barcode is positioned upward and transported on the carrying-in line I1 or carrying-in line I2.

A standard sorting the cartridge M in the embodiment is a machine ordinal number of a winder by which a magnetic tape in the cartridge M is wound. In producing the cartridge M, the magnetic tape is wound in a reel for products from another reel called a pancake in which a long tape corresponding to ten and several pieces of products is wound. Winders used for winding are generally used in plurality to synchronize with a speed of a production line and the sorting apparatus 1 is composed so as to sort/array the cartridge M in different trays T depending on a machine ordinal number of a winder in order to control a quality for every wound pancake and winder.

On the ways of the carrying-in line I1 and carrying-in line I2 and in the upstreams of the stations S1, . . . , S22, the barcode readers 11 are installed, respectively. The barcode readers 11 are installed above the line I1 and line I2, and are designed to inspect barcodes of cartridges M flowing on the line I1 and line I2. The barcode readers 11 are connected with sorter computers PC1 and PC2, respectively, and signs of read barcodes are transmitted to them.

At one side of places at which the barcode readers 11 are installed, sample discharging machines 13 are installed. The sample discharging machines 13 discharge cartridges M from the carrying-in line I1 and carrying-in line I2 when the cartridges M flowing through the places of the readers 11 are a first piece wound from a certain pancake. The discharged cartridges M are used for inspection.

In the first carrying-in line I1, the stations S1 to S11 are installed downstream the barcode reader 11, and in the second carrying-in line 2, the stations S12 to S22 are installed downstream another barcode reader 11. Each station S1 to S22 becomes a sort destination separated depending on an ordinal machine number of a winder by which a magnetic tape in a cartridge M is wound. Meanwhile, in FIG. 1, the station 3 is shown in virtual lines. At one side of places at which the stations S1 to S22 of the first carrying-in line I1 and second carrying-in line 2, pushers 12 are installed, respectively. The pushers 12 are controlled in their operation by the sorter computers PC1 and PC2, and when cartridges M flowing in front of the pushers 12 are to be sorted in the stations, the pushers 12 operate to push the cartridges M toward the stations. Meanwhile, the pushers 12 installed along the carrying-in line I1 are connected with the sorter computer PC1 so as to be controlled in their operation and the pushers 12 installed along the carrying-in line I2 are connected with the sorter computer PC2 so as to be controlled in their operation.

Because each station S1 to S11 and S12 to S22 are same, the stations S1 and S12 are described below. Meanwhile, the stations S1 to S11 are disposed each other parallel and side by side, and the stations S12 to S22 are disposed each other parallel and side by side, too.

Figure 2:
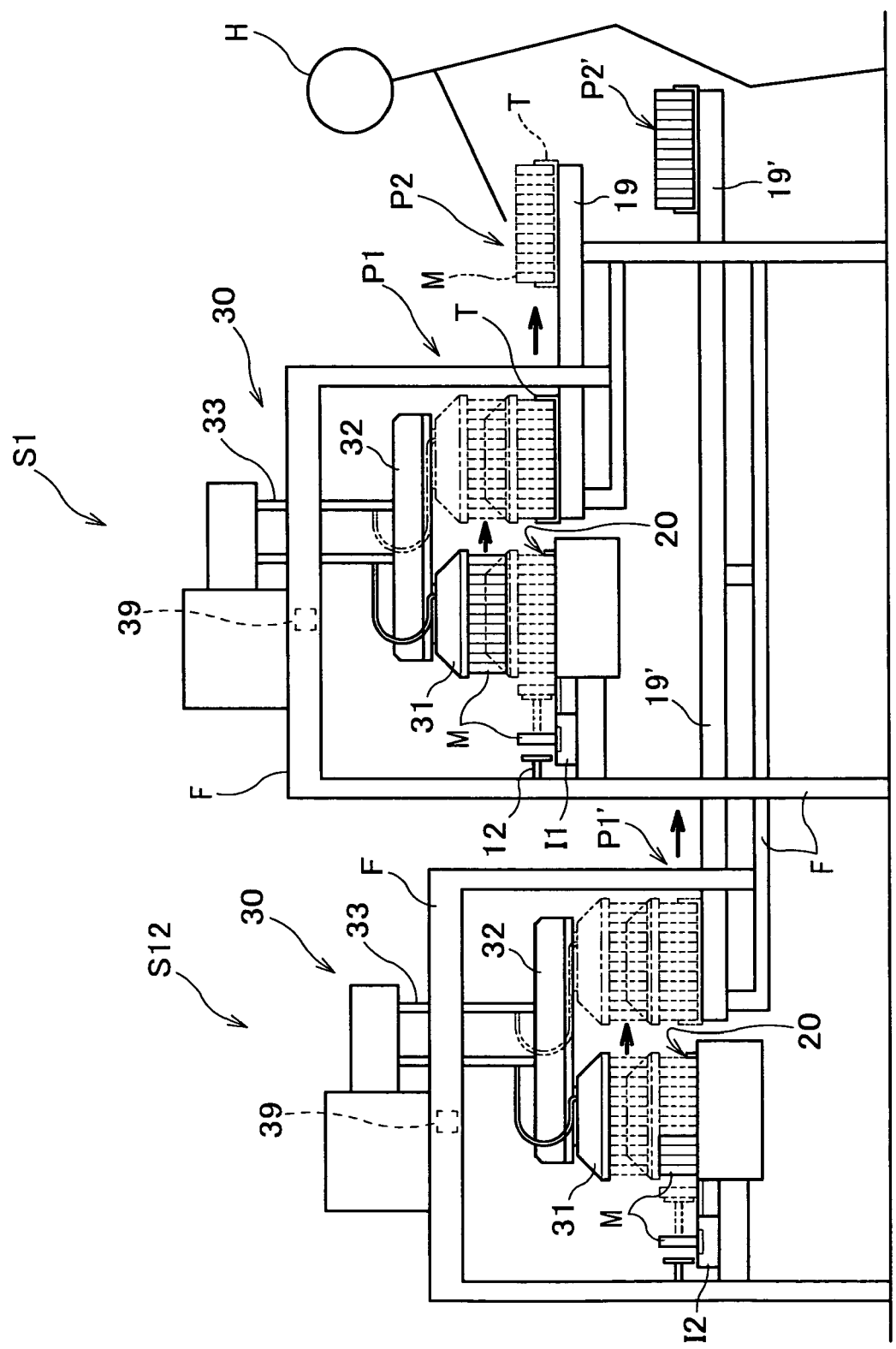
FIG. 2 is a side view of a sorting apparatus related to the embodiment.

The station S1 has, as shown in FIG. 2, a temporary accumulating unit 20 provided neighboring the carrying-in line I1, a transfer machine 30 transferring cartridges M accumulated in the temporary accumulating unit 20 gripping them all together in a tray T at a receiving position P1, and a carrying-out mechanism including a rail 19 which reciprocatingly moves the tray T moving slidably on the rail 19 between the receiving position P1 and a handing-over position P2.

Figure 3:
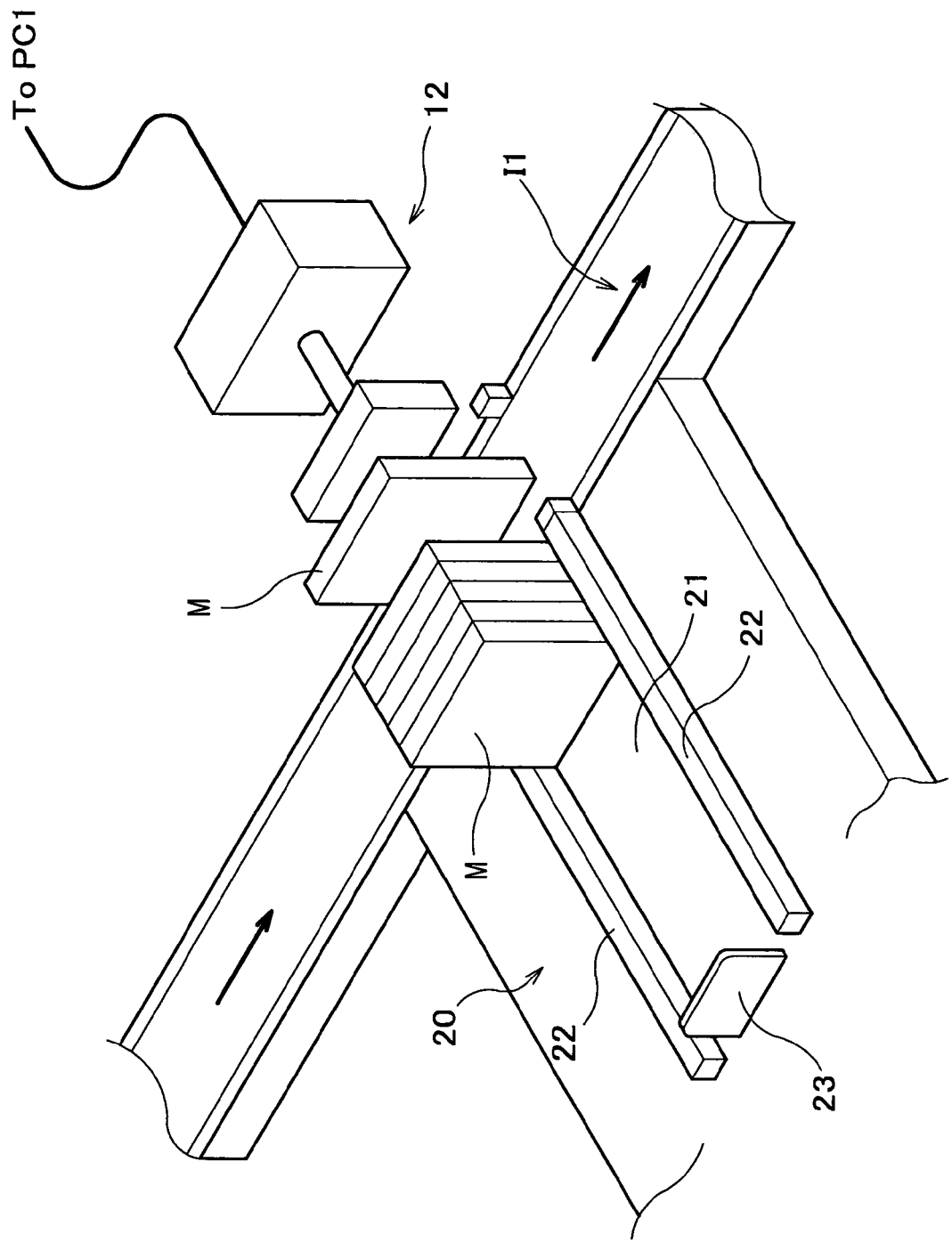
FIG. 3 is a perspective view of a temporary accumulating unit.

The temporary accumulating unit 20, as shown in FIGS. 2 and 3, is composed so as to be formed as a platform with a same height as the carrying-in line I1 and so that the cartridges M pushed out from the line I1 by the pusher 12 can move sliding on an upper surface of the accumulating unit 20. In the embodiment, because the cartridges M are unstable due to being pushed out in a raised state, the line I1 and accumulating unit 20 are set absolutely same in their heights. However, if a step allows a work to be pushed out keeping a work posture, the height of the accumulating unit 20 may be set lower/higher than that of the line I1.

The temporary accumulating unit 20 is provided with linear guides 22 matching a width of cartridges M on a floor 21 on which the cartridges M are accumulated. Moreover, a stopper 23 is vertically provided at a position of the floor 21 matching a predetermined number of overlapped cartridges M. The pusher 12 is disposed opposite to the accumulating unit 20 across the carrying-in line I1 and push a cartridge M in the accumulating unit 20 complying an instruction of the sorter computer PC1. Then, the pusher 12 pushes the cartridge M till a little bit entered place from an entry of the accumulating unit 20 and displaces already accumulated cartridges M toward a back.

In a neighbor of the accumulating unit 20, the rail 19 is laid down and the tray T is disposed on the rail 19. Above the accumulating unit 20 and rail 19, a transfer machine 30 is installed.

The transfer machine 30 is equipped with a gripping unit 31 gripping by pinching a whole of accumulated cartridges M in the accumulating unit 20 from both sides, a rail 32 guiding the gripping unit 31 from above the accumulating unit 20 to above the tray T at the receiving position P1, and an elevator machine 33 moving up and down together with the rail 32. The gripping unit 31 can be reciporocatingly moved on the rail 32 by a motor and/or air cylinder. Operation of the gripping unit 31 and elevator machine 33 is controlled by the sorter computer PC1.

In addition, the transfer machine 30 is composed so as to be able to move across the stations S1 to S11 along a rail 39 installed above them (see FIG. 1). That is, the transfer machine 30 can move among a plurality of columns of the temporary accumulating units 20 and only one is provided for the stations S1 to S11.

The tray T is a container with an upside opening in which a certain cluster of cartridges M being able to be accumulated in the temporary accumulating unit 20 can be contained all together. The tray T can be reciprocatingly moved by a motor and/or air cylinder and its operation is controlled by the sorter computer PC1.

The station 12 is also composed fundamentally similar to the station S1, so, for same portions, detailed descriptions will be omitted by appending same signs.

The station 12 is installed along the second carrying-in line 2 and lower than the station 1 as a whole. A tray T can slidably move on a rail 19' and it is extendedly provided from a receiving position P1' of the transfer machine 30 to a handing-over position P2', going under the station S1, a little bit more outside than a handing-over point P2. Accordingly, the handing-over position P2 of the rail 19 and the handing-over position P2' of the rail 19' are disposed stepwise, whereby a worker H easily takes the tray T.

Meanwhile, each component of the stations S1 and S12 described above is fixed to frames F.

Then, a server computer SV and the sorter computers PC1 and PC2 are described.

The server computer SV is a general computer having a central processing unit, ROM (Read Only Memory), RAM (Random Access Memory), external memory device, and the like, and computes in compliance with programs memorized in the ROM or external memory device, thereby instructing computers (controlling computers) controlling management of a production plan, production operation of the sorter computers PC1 and PC2, and the like. In a data base which the server computer SV has, histories of each cartridge M in production lines transmitted from each controlling computer are recorded. The histories include, for example, a produced date of a magnetic tape, a cut position of the magnetic tape, a specifying number of a used pancake, a machine ordinal number of a used winder, and the like. Thus, the server computer SV operates so as to search/hand needed information from the data base in response to requests of the sorter computers PC1 and PC2.

The sorter computers PC1 and PC2 are computers to control operation of each portion of the sorting apparatus 1, general computers are used for them like the server computer SV, and controlling programs of an external device are introduced into them. The computers PC1 and PC2 receive signs which barcodes of the cartridges M have, that is, IDs of cartridges M, from the barcode readers 11, transmit the IDs to the server computer SV, and receive machine ordinal numbers of winders used for winding magnetic tapes and IDs of pancakes.

Then, based on these information, if a cartridge M passing the barcode readers 11 is one produced from a pancake related to an ID of a first pancake, the sorter computers PC1 or PC2 drives the sample discharging machine 13 and makes the machine 13 discharge a sample for inspection from the first carrying-in line I1 or second carrying-in line I2. On the other hand, depending on a machine ordinal number of a winder used for winding a magnetic tape in the cartridge M, the computers PC1 or PC2 determines its carrying-out station, temporary stops the first carrying-in line I1 or second carrying-in line I2 at the timing when the cartridge M positions in front of determined station of the stations S1 to S22, and makes the cartridge M pushed out to a temporary accumulating unit 20.

Moreover, the sorter computers PC1 and PC2 count a number of cartridges M pushed out to each temporary accumulating unit 20 and when the number reaches a predetermined one, they move the transfer machine 30 to the station, make the machine 30 grip the cartridges M all together, and transfer them to a corresponding tray T.

The sorting apparatus 1 composed as described above operates as follows.

A cartridge M flowing from the first production line L1 respectively enter into the first carrying-in line I1 and pass under the barcode reader 11. Then, an ID of the cartridge M read by the barcode reader 11 is sent to the sorter computer PC1, and an ID of a pancake and a machine ordinal number of a winder used for the cartridge M are inquired from the computer PC1 to the server computer SV. The computer SV, in response to the inquiry, transmits the ID of the pancake and the machine ordinal number of the winder to the computer PC1. If the received ID of the pancake is that of a first pancake, the computer PC1 makes the sample discharging machine 13 actuate and discharge the cartridge M as a sample for inspection from the first carrying-in line I1. On the other hand, if the received ID of the pancake is not that of the first pancake, the computer PC1 does not make the sample discharging machine 13 actuate and makes the cartridge M pass. Then, based on the machine ordinal number of the winder, the computer PC1 determines a carrying-out station of the cartridge M. For example, if the winder is a first machine, the station S1 is determined, and if a second machine, the station S2.

Next, when a cartridge M flows on the first carrying-in line I1 and arrives in front of a carrying-out station where it should be carried out, the computer PC1 makes the line I1 temporary stop, makes a pusher 12 actuate corresponding to the station, thereby pushing out the cartridge M from the line 11 to a temporary accumulating unit 20 (see FIG. 3). Then, when there already exists a cartridge M in the unit 20, a new cartridge is carried out by pushing in the former cartridge, thereby displacing it. By repeating such the operation, the computer PC1 continues on counting cartridges M accumulated in the temporary accumulating unit 20, and if a predetermined number of cartridges M are accumulated, makes the transfer machine 30 actuate and transfer the cartridges M from the unit 20 to tray T. That is, after making the elevator machine 33 move down and pitch/grip the cartridges M with the gripping unit 31, the computer PC1 makes the machine 33 move up, the unit 31 move above the tray T, moreover, the machine 33 move down, and the unit 31 open, thereby making the cartridges M placed on the tray T. Then, making the machine 33 move up, makes the unit 31 move so as to return above the unit 20.

Lastly, the sorter computer PC1 makes the tray T move sliding on the rail 19 from the receiving position P1 to the hanging-over position P2. Thus, only cartridges M using magnetic tapes wound by a same winder are arrayed on the tray T. Although the cartridges M arrayed on the tray T of the hanging-over position P2 wait for being used at a next process by the worker H, during this time, the temporary accumulating unit 20 is open, so if a cartridge M wound by the winder with the same machine ordinal number further flows, the cartridge M can be carried out into the unit 20. That is, the first production line L1 and first carrying-in line I1 can continue on operating without being stopped.

Meanwhile, operation of cartridges M in production of the second production line L2 is similar to that of the first production line L1, so its description will be omitted.

Described as above, the sorting apparatus 1 of the invention enables equipment cost to be restrained low by making only two transfer machines 30 sufficient, notwithstanding there being 22 columns of the stations S1 to S22. Accordingly, space for installing the machines 30 suffices to be less, thereby line space being able to be saved. Moreover, even in a state that cartridges M remain on a tray T which carried out cartridges M, if a next cartridge M comes, the cartridge M can be carried out from the first or second carrying-in line I1 or I2, as far as the temporary accumulating unit 20 is open, thereby production of cartridges M being able to be continued.

Furthermore, the sorting apparatus 1 installs two systems of the first/second carrying-in lines 11 and 12 side by side, arrays cartridges M carried out from these lines on trays T, and makes the trays T range stepwise, thereby being designed for the worker H who carries cartridges M to the next process to easily take them.

Thus, although the embodiment of the invention is described, the invention is not limited to the embodiment and can be practiced changing as needed.

For example, a work is not restricted to a magnetic tape cartridge, not specifically limited to an electric appliance, precision machine, food, and the like, and if the work can be gripped all together in an arrayed state, any work is applicable.

Figure 4:
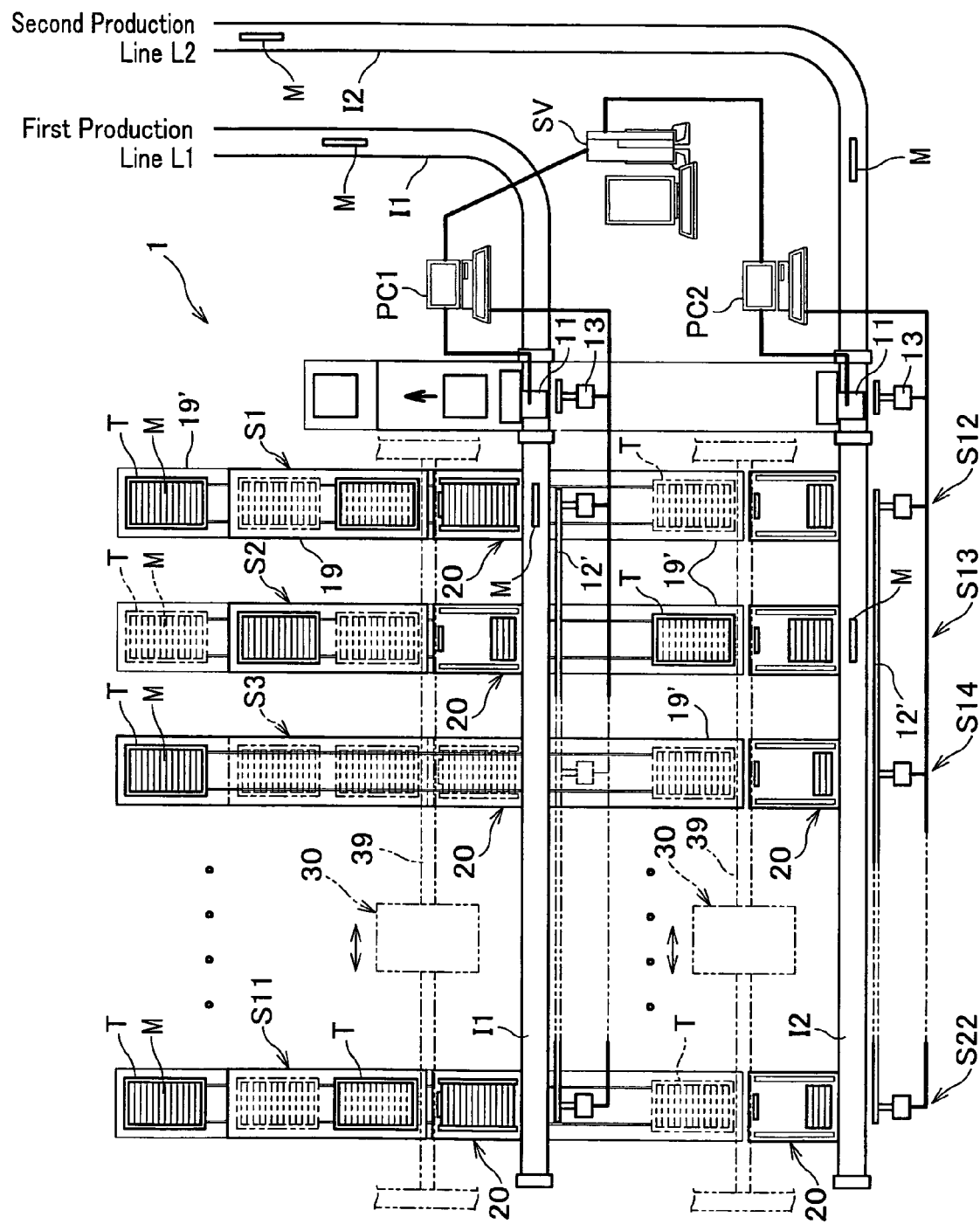
FIG. 4 is a plan view of a sorting apparatus related to a variation example.

Moreover, in the embodiment, although one pusher 12 is provided for each station S1 to S22, a long plate-form pusher 12' is available as shown in FIG. 4. In this case, it is preferable to make a production timing to flow only one cartridge M downstream the barcode reader 11 in FIG. 4, to once stop the first or second carrying-in line when the cartridge M arrives in front of a station where the cartridge M should be carried out, to actuate the pusher 12', and to push out the cartridge M into the temporary accumulating unit 20.

Furthermore, in the embodiment, although the barcode reader 11 is used as a work identifying machine, it is also available to compose so that an ID is directly printed on a work surface and read by an OCR (Optical Character Reader), and an IC (Integrated Circuit) memorizing an ID is provided on a work, thereby the ID being read from the IC.

What is claimed is:

1. A sorting apparatus which separates a work flowing on a production line according to a predetermined standard and arrays the work in one column, the apparatus comprising:
   a carrying-in line carrying in the work;
   a work identifying machine provided on the way of said carrying-in line;
   a plurality of columns of temporary accumulating units installed neighboring said carrying-in line at an approximately same height as the carrying-in line;
   a plurality of trays provided respectively corresponding to said plurality of columns of temporary accumulating units;
   a pusher pushing out the work which flows in said carrying-in line into one column of said temporary accumulating units based on a result identified by said work identifying machine; and
   a transfer machine that grips and transfers a predetermined number of works all together to said trays corresponding to said temporary accumulating units when said predetermined number of works is accumulated in said temporary accumulating units,
   wherein said transfer machine comprises a gripping unit, and an elevator machine for raising and lowering said gripping unit, and a rail positioned to extend above said plurality of trays and said plurality of temporary accumulating units, such that said gripping unit can grip and transfer said predetermined number of works from said plurality of temporary accumulating units to said plurality of trays via said rail and said elevator machine.

2. The sorting apparatus as claimed in claim 1, wherein said transfer machine is composed so that a transfer of works from more than one temporary accumulating unit to said trays corresponding to the temporary accumulating units is achieved.

3. The sorting apparatus as claimed in claim 2, which comprises a carrying-out mechanism moving respective said trays from a receiving position in which a predetermined number of works is transferred from said temporary accumulating units to a handing-over position into a next process.

4. The sorting apparatus as claimed in claim 2, wherein said pushers are provided for respective said plurality of columns of temporary accumulating units, and wherein said work is pushed out by a pusher corresponding to said plurality of columns of temporary accumulating units.

5. The sorting apparatus as claimed in claim 2, wherein said pusher is a single pusher plate provided for said plurality of columns of temporary accumulating units, and wherein said work is pushed out into said plurality of columns of temporary accumulating units by said single pusher plate.

6. The sorting apparatus as claimed in claim 1, which comprises a carrying-out mechanism moving respective said trays from a receiving position in which a predetermined number of works is transferred from said temporary accumulating units to a handing-over position into a next process.

7. The sorting apparatus as claimed in claim 6, wherein said pushers are provided for respective said plurality of columns of temporary accumulating units, and wherein said work is pushed out by a pusher corresponding to said plurality of columns of temporary accumulating units.

8. The sorting apparatus as claimed in claim 6, wherein said pusher is a single pusher plate provided for said plurality of columns of temporary accumulating units, and wherein said work is pushed out into said plurality of columns of temporary accumulating units by said single pusher plate.

9. The sorting apparatus as claimed in claim 1, wherein said pushers are provided for respective said plurality of columns of temporary accumulating units, and wherein said work is pushed out by a pusher corresponding to said plurality of columns of temporary accumulating units.

10. The sorting apparatus as claimed in claim 1, wherein said pusher is a single pusher plate provided for said plurality of columns of temporary accumulating units, and wherein said work is pushed out into said plurality of columns of temporary accumulating units by said single pusher plate.

11. A sorting apparatus which separates a work flowing on a production line according to a predetermined standard and arrays the work in one column, the apparatus comprising:
   a carrying-in line carrying in the work;
   a work identifying machine provided on the way of said carrying-in line;
   a plurality of columns of temporary accumulating units installed neighboring said carrying-in line at a same height as the carrying-in line;
   a plurality of trays provided respectively corresponding to said plurality of columns of temporary accumulating units;
   a pusher pushing out a work which flows in said carrying-in line into one column of said temporary accumulating units based on a result identified by said work identifying machine; and
   a transfer machine that grips and transfers a predetermined number of works all together to said trays corresponding to said temporary accumulating units when said predetermined number of works is accumulated in said temporary accumulating units,
   wherein said transfer machine comprises a gripping unit, and an elevator machine for raising and lowering said gripping unit, and a rail positioned to extend above said plurality of trays and said plurality of temporary accumulating units, such that said gripping unit can grip and transfer said predetermined number of works from said plurality of temporary accumulating units to said plurality of trays via said rail and said elevator machine.

12. The sorting apparatus as claimed in claim 11, wherein said transfer machine is composed so that a transfer of works from more than one temporary accumulating unit to said trays corresponding to the temporary accumulating units is achieved.

13. The sorting apparatus as claimed in claim 12, which comprises a carrying-out mechanism moving respective said trays from a receiving position in which a predetermined number of works is transferred from said temporary accumulating units to a handing-over position into a next process.

14. The sorting apparatus as claimed in claim 12, wherein said pushers are provided for respective said plurality of columns of temporary accumulating units, and wherein said work is pushed out by a pusher corresponding to said plurality of columns of temporary accumulating units.

15. The sorting apparatus as claimed in claim 12, wherein said pusher is a single pusher plate provided for said plurality of columns of temporary accumulating units, and wherein said work is pushed out into said plurality of columns of temporary accumulating units by said single pusher plate.

16. The sorting apparatus as claimed in claim 11, which comprises a carrying-out mechanism moving respective said trays from a receiving position in which a predetermined number of works is transferred from said temporary accumulating units to a handing-over position into a next process.

17. The sorting apparatus as claimed in claim 16, wherein said pushers are provided for respective said plurality of columns of temporary accumulating units.

18. The sorting apparatus as claimed in claim 16, wherein said pusher is a single pusher plate provided for said plurality of columns of temporary accumulating units, and wherein said work is pushed out into said plurality of columns of temporary accumulating units by said single pusher plate.

19. The sorting apparatus as claimed in claim 11, wherein said pushers are provided for respective said plurality of columns of temporary accumulating units, and wherein said work is pushed out by a pusher corresponding to said plurality of columns of temporary accumulating units.

20. The sorting apparatus as claimed in claim 11, wherein said pusher is a single pusher plate provided for said plurality of columns of temporary accumulating units, and wherein said work is pushed out into said plurality of columns of temporary accumulating units by said single pusher plate.

* * * * *